United States Patent [19]

Kent

[11] Patent Number: 5,326,475
[45] Date of Patent: Jul. 5, 1994

[54] METHOD FOR AERATED BIOFILTRATION

[76] Inventor: Dana M. Kent, 4509 Hickory Creek La., Brandon, Fla. 33511

[21] Appl. No.: 898,334

[22] Filed: Jun. 15, 1992

Related U.S. Application Data

[63] Continuation-in-part of Ser. No. 490,834, Mar. 8, 1990, Pat. No. 5,122,266.

[51] Int. Cl.$^5$ .................................................. C02F 3/06
[52] U.S. Cl. ...................................... 210/615; 210/747
[58] Field of Search ............... 210/150, 151, 170, 219, 210/242.2, 615–618, 747

[56] References Cited

U.S. PATENT DOCUMENTS

| | | | |
|---|---|---|---|
| 3,235,234 | 2/1966 | Beaudoin | 210/242.2 |
| 4,350,589 | 9/1982 | Stog | 210/242.2 |
| 4,690,756 | 9/1987 | Van Ry | 210/242.2 |
| 4,906,359 | 3/1990 | Cox, Jr. | 210/242.2 |

Primary Examiner—Thomas Wyse
Attorney, Agent, or Firm—Michael J. Colitz, Jr.

[57] ABSTRACT

An apparatus and method for removing contaminants from a body comprising in combination the steps of positioning a filter means in the water, the filter means having pluralities of surfaces providing high surface area per volume; supporting biological agents on the surfaces for removing contaminants from water to be cleaned as it flows through the filter means; locating the filter means spaced from the bottom of the water to be cleaned; providing a fluid flow means with a discharge component; effecting the flow of a pressurized fluid by the fluid flow means, from the discharge component, through the water, and across the surfaces in circuitous paths for the removing of contaminants from the water; and positioning the discharge component beneath the filter means and above the bottom of the water for directing the flow of water through the filter means.

11 Claims, 6 Drawing Sheets

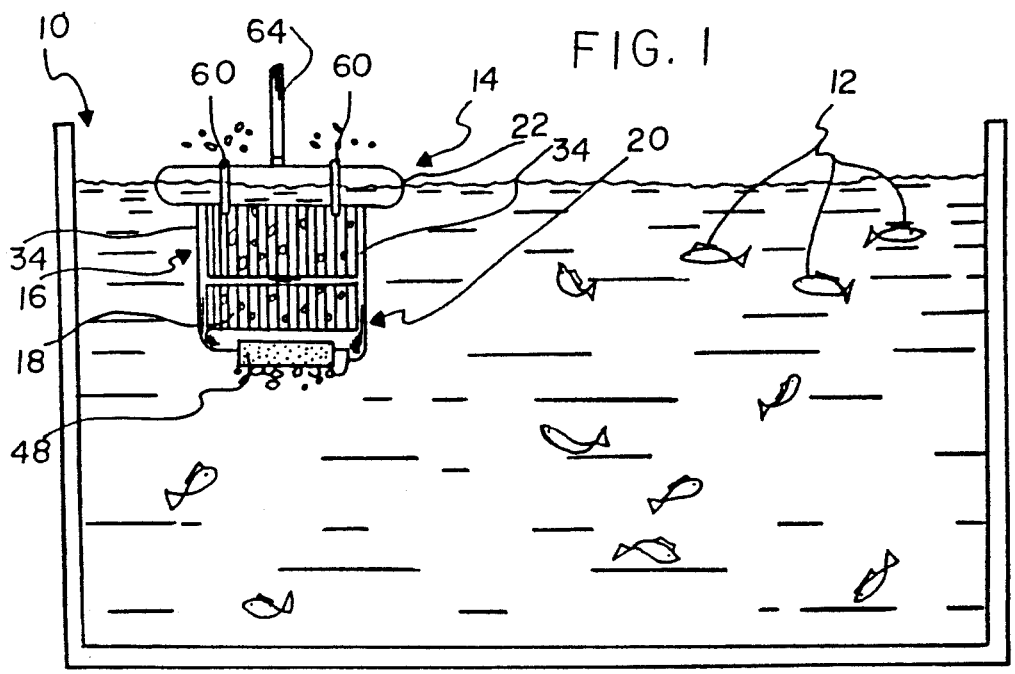
FIG. 1
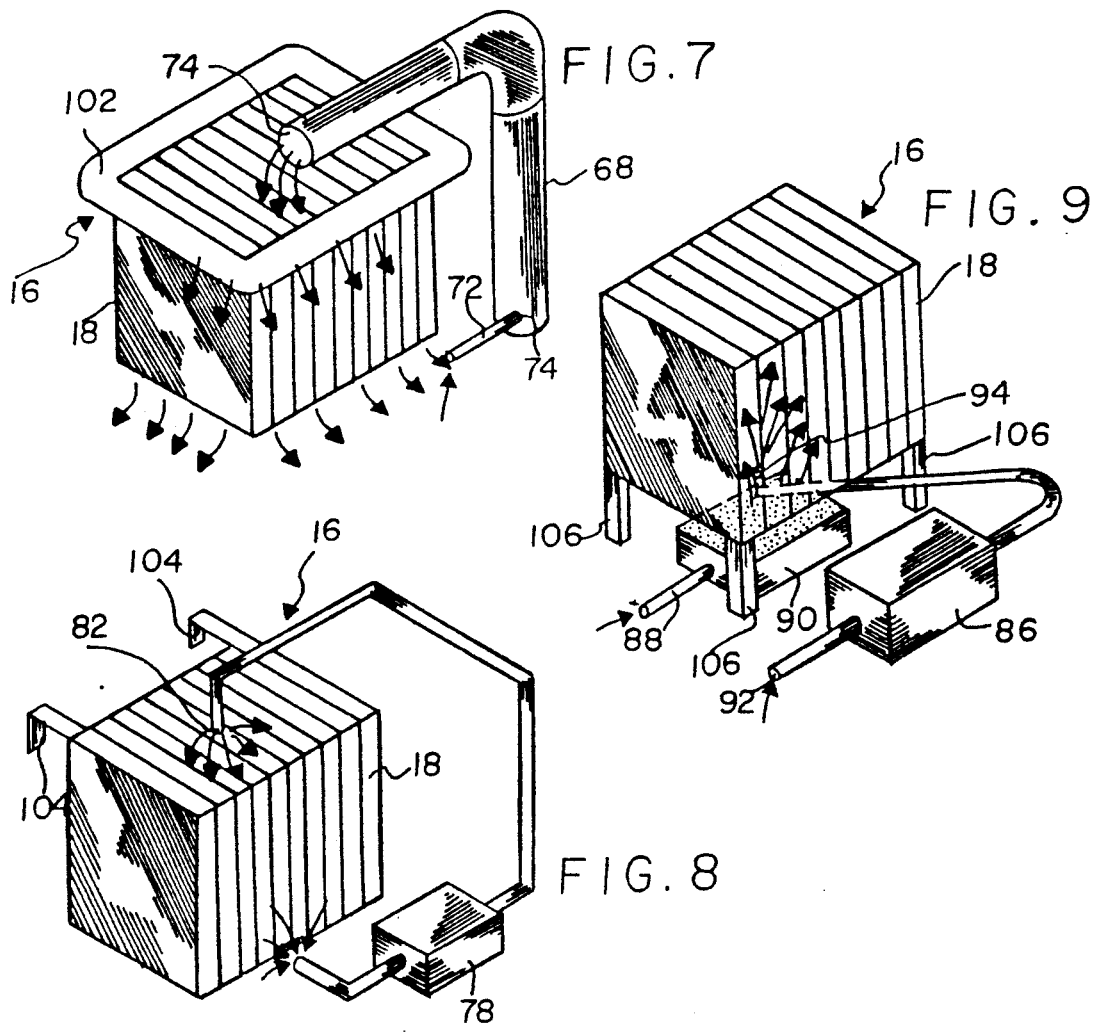
FIG. 7
FIG. 9
FIG. 8

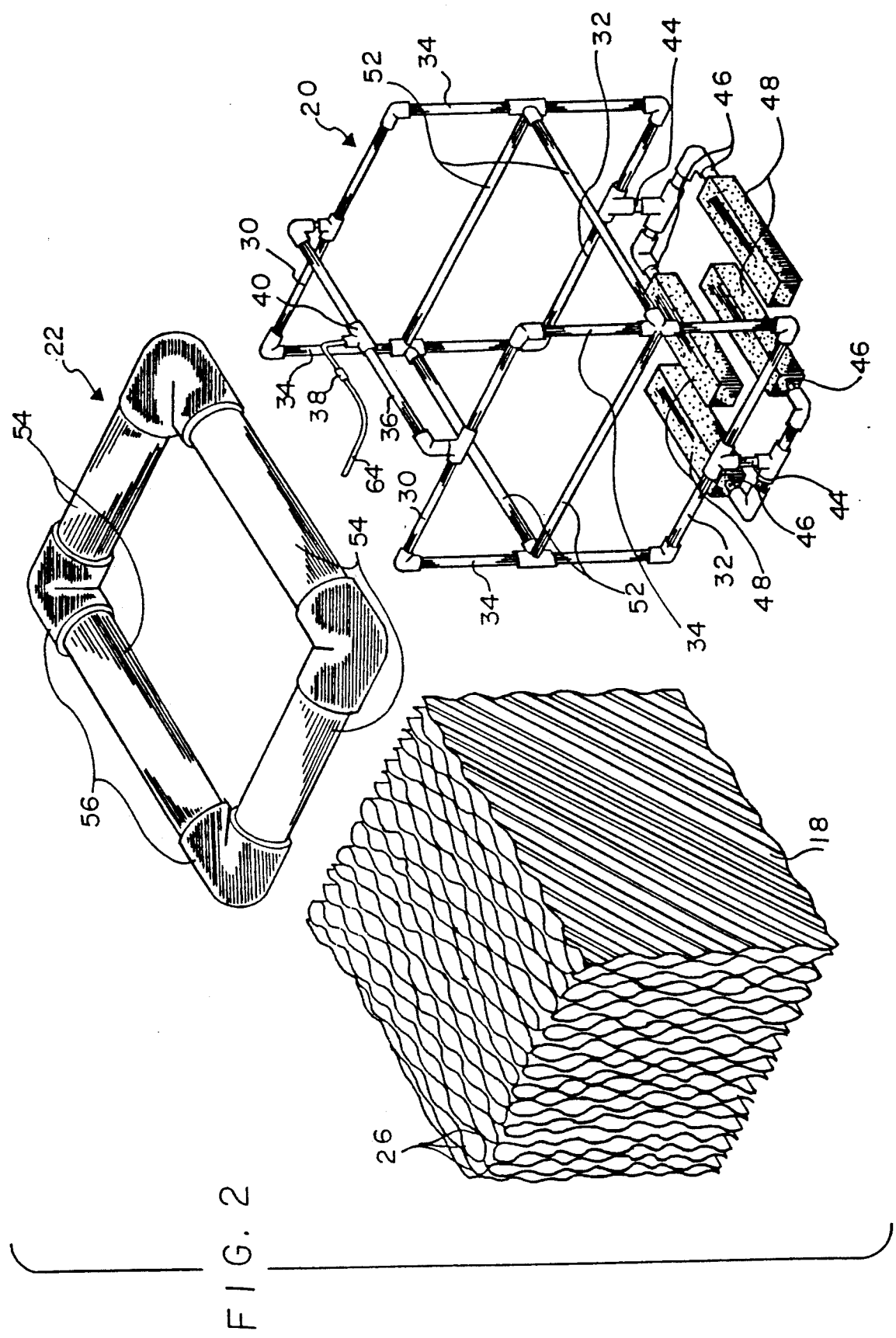

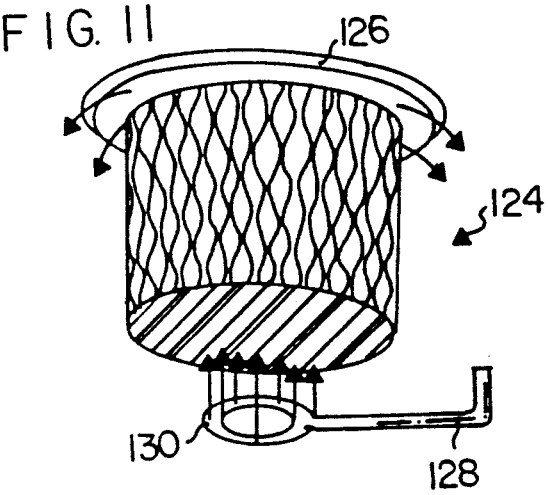
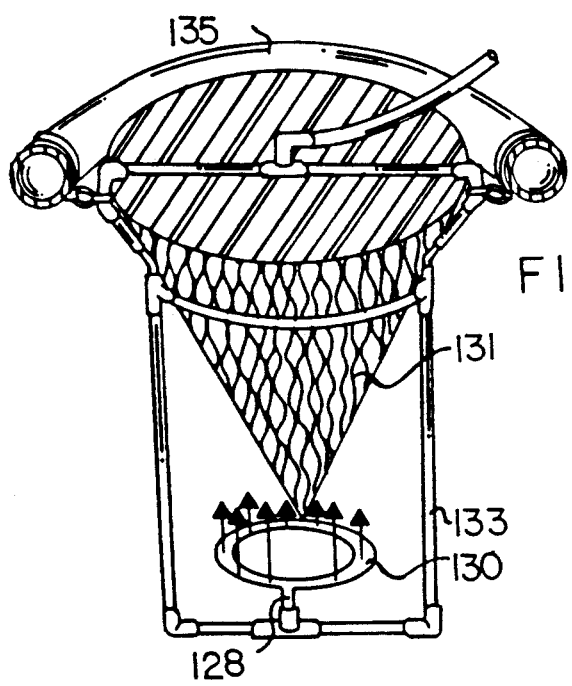
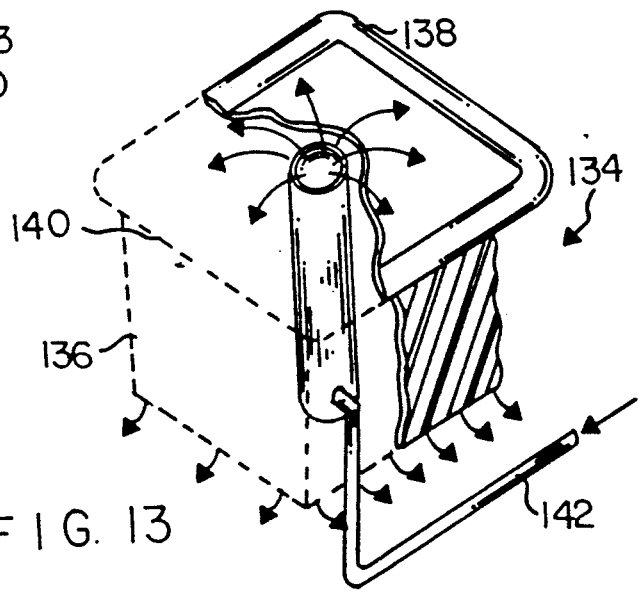

METHOD FOR AERATED BIOFILTRATION

RELATED APPLICATION

This application is a continuation-in-part of copending application Ser. No. 07/490,834, filed on Mar. 8, 1990, now U.S. Pat. No. 5,122,266.

BACKGROUND OF THE INVENTION

1. Summary of the Invention

This invention relates to a method and apparatus for aerated biofiltration support and, more particularly, to a method and apparatus comprising filter, support assembly and associated components for effecting a flow of fluid across the filter to effect the removal of contaminants from the water in which the apparatus is located, including aeration, biological filtration, circulation, degassing and foam fractionation of the fluid crossing the substrate, the function and application are not dependent on fish in the fluid since the method and apparatus are applicable to any fluid containing contaminants from any origins.

2. Description of the Background Art

There is an ever-increasing demand for fish. Such fish might be utilized for human consumption, for aquariums, for ornamental ponds, or for a wide variety of other purposes. To meet this demand, fish are grown in reservoirs, ponds, aquariums, artificial containers, or the like. The care and maintenance of such fish, however, is an expense which increases the unit cost or price per pound of the fish or requires considerable expense in complex water pump and filtration systems. A wide variety of techniques have been attempted in the past to increase the efficiency of reservoirs. Such past attempts have been limited in their success.

By way of technical background, fish and other aquatic animals, in both fresh and salt water, take in food through their mouths and oxygen through their gills. They excrete nitrogenous waste into the water. Within such waste is ammonia, a toxic substance which has the negative effects on fish of reducing growth and stressing immune systems and if left unchecked will quickly be fatal. The toxic by-products of this waste are generated in the metabolism of the fish during the natural life sequence. Also in the natural sequence, such toxic by-products are dissolved in water. Only limited quantities of such by-products in water can be tolerated before the negative effects will cause mortalities.

In the natural sequence, one naturally occurring by-product of the partially toxic water are beneficial bacteria and other microfauna that are present in the gut of fish, aquatic animals, sediments and water column. Such bacteria and microfauna would tend to coat surfaces of a reservoir or the bottom of a pond. Such bacteria and microfauna would tend to consume, and thus remove, the toxic wastes from the water to extend the usefulness of the water in retaining fish and other aquatic life. These same bacteria and microfauna, through the natural processes of selecting and metabolizing the full range of nutrients available to the numerous species of bacteria and microfauna are also capable of metabolizing the nutrients that nominally result in algal growth. The high concentration of aerated, aerobic bacteria and microfauna present in the substrate successfully compete with the algae present in the pond. The bacteria and microfauna significantly reduce the levels of algae present by metabolizing the nutrients needed by the algae for growth. The degassing of carbon dioxide also serves to limit this growth factor required by algae and therefore also serves to reduce the levels of visible algae present. The ability of this invention to serve as a processing site to efficiently metabolize the ammonia and nutrients resulting from fish farming while successfully competing with algae for their nutrients, enables this invention to serve a dual purpose either with or without fish present in the body of water.

The present invention is also a most effective solution for removing contaminants to virtually all landscape and ornamental water systems including decorative fish ponds, golf course waterways, retention ponds, lagoons, etc. in which both natural and man-made sources of nutrients such as lawn and plant fertilizers and other sources of runoff enter these waters.

Various approaches are utilized commercially and are disclosed in the literature for increasing the efficiency of methods and apparatus for removing contaminants from water. By way of example, note U.S. Pat. Nos. 4,623,454 to Tauscher, 4,634,534 to Cominetta and 4,666,593 to Bosne. These patents disclose filter media for effecting the purification of water thereacross. In addition, U.S. Pat. Nos. 3,852,384 to Bearden and 4,690,756 to Ry disclose mechanisms for effecting a flow of fluids for water purification purposes.

Also pertinent is U.S. Pat. No. 3,235,234 to Beaudoin. According to that disclosure, plural plates are placed in water. The plates are coupled in a spaced relationship with respect to each other. A flow of water is effected to cause movement between the water and plates in a horizontal direction. Unlike the present invention there are no generally vertical tubes to effect a vertical flow of fluid, there are no mechanisms to effect the flow of fluid to generate any oscillating motion to the substrate to effect self-cleaning of the substrate, there are none of the increased beneficial effects of a composite biofiltration, nitrification, aeration, circulation, degassing and foam fractionation as in the present invention.

Although many such advances are noteworthy for one purpose or another, none achieves the objectives of an efficient, reliable, inexpensive, convenient to use system for effecting a flow of fluid across a filter to effect the removal of contaminants including biofiltration, nitrification, aeration, circulation, degassing and foam fractionation of the water in which the system is located.

As illustrated by a great number of prior patents and known commercial techniques, efforts are continuously being made in an attempt to purify reservoir water more efficiently, reliably, inexpensively and conveniently. None of these prior efforts, however, provides the benefits attendant with the present invention. Additionally, prior techniques do not suggest the present inventive combination of method steps and component elements as disclosed and claimed herein. The present invention achieves its intended purposes, objectives and advantages over the prior art through a new, useful and unobvious combination of claimed method steps and components which is simple to use, with the utilization of a minimum number of functioning parts, at a reasonable cost to manufacture and by employing only readily available materials and requires no maintenance even after years of continuous operation.

Therefore, it is an object of this invention to provide an improved apparatus and method for removing contaminants from a body comprising in combination the steps of positioning a filter means in the water, the filter means having pluralities of surfaces providing high surface area per volume; supporting biological agents on the surfaces for removing contaminants from water to be cleaned as it flows through the filter means; locating the filter means spaced from the bottom of the water to be cleaned; providing a fluid flow means with a discharge component; effecting the flow of a pressurized fluid by the fluid flow means, from the discharge component, through the water, and across the surfaces in circuitous paths for the removing of contaminants from the water; and positioning the discharge component beneath the filter means and above the bottom of the water for directing the flow of water through the filter means.

It is a further object of the invention to support a filter so that the flow of water thereover will effect its purification It is a further object of the invention to effect the flow of water over a filter to effect the removal of its contaminants including biofiltration, nitrification, aeration, circulation, degassing and foam fractionation.

It is a further object of the invention to utilize a filter support assembly as a conduit for directing a flow of water purifying air across the supported filter.

It is an object of the present invention to maximize the quantity of fish which may be grown in a reservoir and to reduce the need to maintain algae in a sunlit reservoir to bioconvert nutrient loads.

Lastly, it is an object of the present invention to remove contaminants from a body of water including decorative fish ponds, golf course waterways, retention ponds, lagoons as well as fish faiths.

The foregoing has outlined some of the more pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into an improved apparatus and method for removing contaminants from a body comprising in combination the steps of positioning a filter means in the water, the filter means having pluralities of surfaces providing high surface area per volume; supporting biological agents on the surfaces for removing contaminants from water to be cleaned as it flows through the filter means; locating the filter means spaced from the bottom of the water to be cleaned; providing a fluid flow means with a discharge component; effecting the flow of a pressurized fluid by the fluid flow means, from the discharge component, through the water, and across the surfaces in circuitous paths for the removing of contaminants from the water; and positioning the discharge component beneath the filter means and above the bottom of the water for directing the flow of water through the filter means.

The locating of the filter means may be at the surface of the water, beneath the surface of the water, or at a predetermined height with respect to the surface of the water. The flow is effected essentially vertically. The method further includes the step of mechanically filtering the pressurized fluid leaving the filter means. The pressurized fluid is a mixture of water and air with the air entering the flow of water by the Venturi effect. The method further includes the step of conveying away the by-products of foam fractionation from above the float ring. The method further includes the step of constraining the flow of pressurized fluid in generally vertically extending tubes. The method further includes the adjusting of the height of the filter means with respect to the water level.

The invention may also be incorporated into a method for removing contaminants from a body of water comprising in combination positioning a filter means in the water, the filter means having surfaces for the support of biological agents for assisting in the cleaning of the water in which it is positioned; providing a frame assembly having generally horizontal tubular upper and lower frame members and generally vertical tubular intermediate frame members joining the upper and lower frame members thereby constituting a three-dimensional generally cubic shape, the tubular members adapted for receiving and supporting the filter means in the water, the tubular members being hollow and operatively interconnected for the passage of fluid therethrough and with a first opening operatively associated with an upper frame member for coupling with a source of pressurized fluid and with a second opening associated with a lower frame member for coupling with diffuser means for effecting discharge of the pressurized fluid from the source of pressurized fluid upwardly through the water and across the surfaces of the filter means for cleaning of the water by the biological agents supported on the surface of the filter means; and securing a float ring with respect to the frame assembly and being horizontally disposed for providing the necessary buoyancy for maintaining the upper surface of the frame assembly adjacent to the surface of the water and with the lower surface of the frame assembly spaced from the bottom of the reservoir.

Lastly, the invention may also be incorporated into a method for the removing of contaminants from a body of water comprising in combination positioning a filter means in the water, the filter means having surfaces; supporting biological agents on the surfaces for assisting in the cleaning of the water in which it is positioned; receiving and supporting the filter means in the water for the passage of fluid through the filter; effecting discharge of a pressurized fluid through the water and across the surfaces of the filter means in circuitous paths for removing contaminants from the water; and maintaining the filter means above the bottom of the reservoir.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiments may be readily utilized as a basis for modifying or designing other methods and structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the invention, reference should be had to the following description taken into conjunction with the accompanying drawings in which:

FIG. 1 is a schematic illustration of a system constructed in accordance with the present invention, the system having been deployed in a reservoir for purification of its water.

FIG. 2 is an exploded perspective view of the filter system shown in FIG. 1.

FIGS. 7 through 9 are illustrations of alternate embodiments of the invention.

FIGS. 11, 12 and 13 are perspective showings of two further alternate embodiments of the invention.

FIG. 13 is yet a further alternate embodiment of the invention.

Similar reference characters refer to similar parts throughout the various Figures.

DETAILED DESCRIPTION OF THE INVENTION

Figure 3:
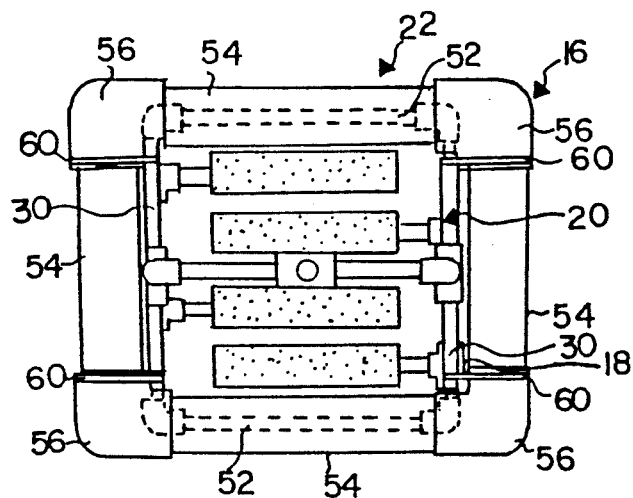
FIGS. 3 through 6 are front and side elevational views as well as top and bottom plan views of the filter system of FIG. 2.
Figures 4, 5:
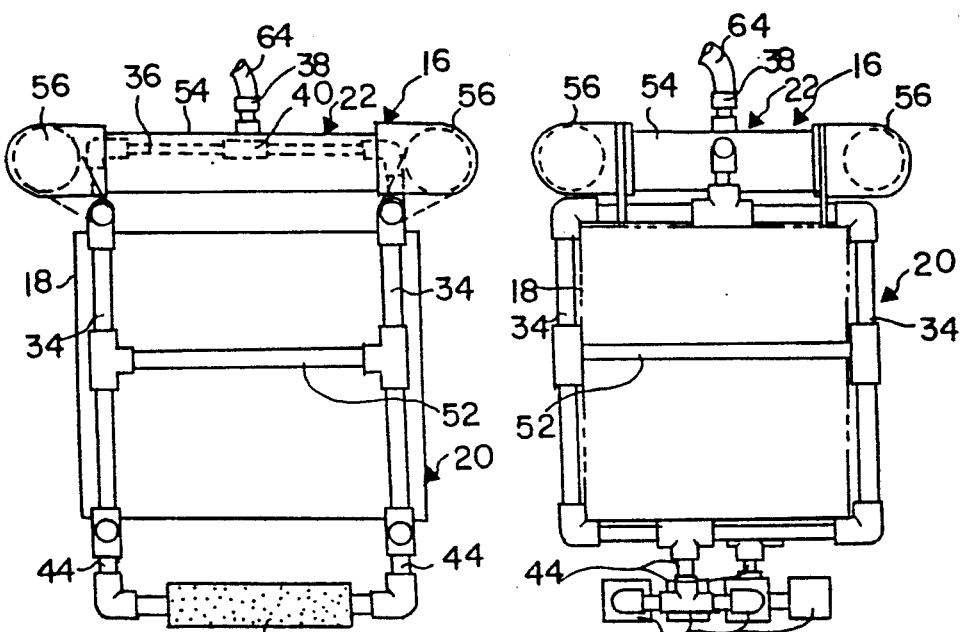
Figure 6:
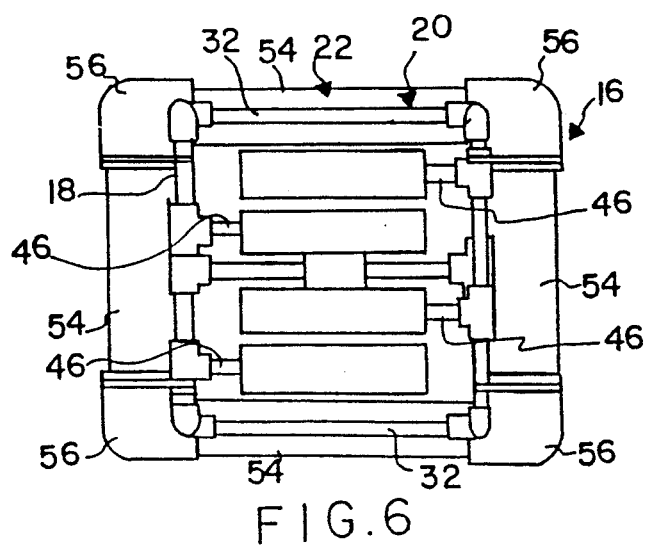

Shown in FIG. 1 is a fish farming reservoir 10 in which fish 12 are grown for food, ornamental, or other purposes. The filter system 14 of the present invention is shown in FIG. 1 but is better seen in the exploded perspective illustration of FIG. 2 and in the additional plan and elevation views. The system includes a life support module 16 which includes a filter 18 and a support assembly 20 as well as associated components 22.

The filter 14 itself is shown in its preferred embodiment as a commercially available unit fabricated of corrugated rigid PVC sheets 26 in a preselected modular shape, preferably cubic. Other shapes are readily utilized such as a rectangle, cylinder, sphere, or the like. The fluid travels upwardly at an angle through a series of serpentine channels formed by the corrugations of each layer of rigid PVC sheeting laid on each other. Filters manufactured by Munters Corporation under the trade name "Biodec" are representative of the category and type of filter used. Another acceptable filter is that disclosed in U.S. Pat. No. 4,634,534 to Cominetta, the subject matter of which is incorporated by reference herein.

Preferred filters are those which provide pluralities of facing surfaces for the flow of water therethrough. Such surfaces allow for the flowing fluid to follow circuitous paths defined by the surfaces. Further, they provide high surface area per unit volume of filter for greater efficiency of all processes generated.

Fish consume oxygen and generate ammonia and other nitrogen based compounds as waste products in their daily metabolic activities effectively reducing the amount of oxygen in the water while increasing the toxic bi-products. The quantity of fish which can live within the reservoir is increased with an increase in the amount of available oxygen in the water. Conversely, the quantity of fish which can live in the reservoir is decreased by the increase of toxic ammonia in the water. The ability of fish to survive and grow in water is increased by removing the ammonia/nitrogen waste products through the process of nitrification. During nitrification, the ammonium/nitrogen is converted into nitrite and then nitrate by bacteria nominally found in water, sediments and inside aquatic organisms. These bacteria are naturally present in low concentrations and can be supplemented by commercially available cultures that result in a higher bacterial concentration or colony within the fish reservoir. The colony requires a host location upon which it, too, may thrive and grow. The filter of the present invention constitutes such a host location. In order to increase nitrification, and, thus, the health of the fish and overall water quality, the filter system is operatively positioned within the reservoir in which water is pumped through for processing. The filter system is small, aesthetically pleasing and uniquely efficient in carrying out the biofiltration, aeration, nitrification, circulation, degassing and foam fractionation processes.

The substrate 18 is that part of the system over which the water flows to effect its cleaning or purification by nitrification, the biological oxidation of microbiological digestible compounds within the water as well as increasing oxygen levels, degassing and generating high outwardly circulating flow rates of purified water as well as foam fractionation of the water. The bacteria grow on the surface of the substrate and convert the dissolved organic waste material and the ammonia nitrogen into by-products including carbon dioxide, nitrites and then nitrates. The biological solids are dropped to the bottom of the fish farming reservoir and are removed later by clarification or to drain or by macrofauna such as species of snails and worms. The substrate methodology of the present invention involves low power consumption, extremely high reliability, and the lack of moving parts therein.

The speed of the initial colonization of the substrate material can be enhanced by the addition of any one of several commercially available live bacterial cultures, such as produced by Aqua Bacta Aid Water from Quality Science, Inc. of Bolivar, Mo., or Cycle from Hagan (U.S.A.) Corp. of Mansfield, Mass. These cultures incorporate several species of bacteria whose qualitative and quantitative populations in the substrate material fluctuate as a direct function of the qualitative and quantitative nutrient and oxygen supply available in the reservoir. Once seeded and colonized, the substrate material becomes a self-regulating entity that continually adjusts and stabilizes to any alterations in water quality. Only extreme circumstances, i.e., removal from water and drying totally out and death of all bacteria colonies, or the addition of strong antibiotics, or toxic chemicals deleterious to bacteria will totally extinguish the colony and require the reseeding of the substrate.

In the preferred embodiment, the substrate 18 is located in the proper operative position and orientation above the lower surface of the reservoir by the hollow tubular frame assembly 20. The substrate 18 is housed within a three dimensional zone established and defined by the hollow tubular frame assembly. The hollow tubular frame assembly has upper horizontal parallel frame members 30 and lower horizontal parallel frame members 32 connected at each corner by vertical joining tubes 34 forming side rectangles. The substrate 18 is supported on parallel frame members. The upper horizontal frame member also has a hollow tubular transverse crossmember 36 with an air inlet hole 38 in a coupling 40. The air inlet coupling 40 connects to a nonillustrated air blower or air compressor by conventional air tubing and/or piping.

As can best be seen in FIG. 2, the lower horizontal frame members 32 are coupled by tubes 44 to a plurality of openings 46 which function as air outlets. Each air outlet is coupled to an air discharge diffuser 48 which constitutes a discharge component located below the substrate but above the bottom of the water and reservoir. The air diffusers are arranged to evenly distribute air flow upwards to all surfaces of the substrate 18. The air diffusers 48 are paired and attached to the leftmost portion of the lower horizontal frame members and disposed towards the rightmost portion of the lower horizontal frame members. Additional air diffusers are paired and attached to the rightmost portion of the lower horizontal frame members and disposed towards the leftmost portion of lower horizontal frame members. Intermediate frame members 52 join the midpoints of the vertical tubes 34. The frame thus permanently encloses the substrate material.

The hollow tubular frame assembly 20 and the substrate 18 are supported in the water by a float ring 22. The float ring is assembled from tubular hollow pipe 54 and fittings 56, preferably, PVC or ABS pipe and fittings or solid buoyant material such as styrofoam.

The shape of the float ring is preferable rectangular. Other shapes may be utilized as later described. In the preferred embodiment, the float ring has a square shape. The size and diameter of the pipe comprising the float ring is determined by the buoyant effect required to keep an upper surface of the substrate spaced below the top surface of the water level in the reservoir. The lower surface is spaced from the bottom of the water in the reservoir. The float ring is secured to the frame assembly with straps 60 or other types of rigid supports. Alternatively, the float ring can be attached to the wall of the fish farming reservoir with mounting clips or horizontal supports coupled with respect to the reservoir or on legs resting on the reservoir floor.

During operation and use, the substrate 18 and hollow tubular frame 20 assembly are placed in the reservoir. The hollow tubular frame assembly is coupled to a fluid source by a flexible line 64. The flexible line is coupled at its input to the source of fluid and, at its output end, to the fitting at the upper opening 38 of the hollow tubular frame assembly 20. The fluid, air in the disclosed preferred embodiment, is forced to flow across the surfaces of the substrate media thus effecting a flow of air with water to be cleaned by the nitrification process as described above while simultaneously aerating, degassing, circulating, and foam fractioning. The use of oxygen, either pure or in concentrations higher than that found in ambient air, is also an alternative source of fluid. It is understood that fluid may include any appropriate liquid or gas.

The apparatus as described herein effects several beneficial methods including increased oxygen transfer, increased biological filtration, enhanced circulation, foam fractionating, degassing, self-cleaning, etc. With regard to increased oxygen transfer, as the air bubbles rise from the diffusers, they travel along generally vertical paths through the high surface area substrate. This extends the bubble contact time while also greatly increasing the surface area of contact between air and water. The water then rapidly flows out beneath the flotation ring, dispersing as a sheet of highly oxygenated water across the culture tank or pond.

With regard to increased biological filtration efficiency, after a few weeks the high surface area substrate becomes permanently colonized with beneficial nitrifying bacteria. As the water containing the high dissolved oxygen concentration ammonia and waste nutrients passes up through the colonized high surface area substrate, an ideal aerobic environment for nitrification is created. By constantly providing food, i.e., ammonia, and other organic nutrients and oxygen through the self-induced upward flow of water, a continuous site for very efficient biological filtration is created and maintained.

With regard to enhanced circulation, the continuous self-induced flow of water up through the substrate and out beneath the flotation ring circulates water throughout the tank or pond, spreading oxygenated, ammonia-free water across the surface, while pulling oxygen depleted, ammonia laden water up through the substrate. Flow rates can easily be regulated by adjusting an air control valve. Flow rates of approximately 400 gallons per minute per surface square foot are normal.

With regard to foam fractionating, the flotation ring also serves as a foam retention ring taking toxic proteinaceous materials out of solution while also providing a visual check as to when water changes are needed. When a layer of foam forms that persist and extend above the level of the flotation ring, it can serve to indicate that it is time for a water change or unobserved fish mortalities may be present. The foam fractionation effect also serves to concentrate pathogenic bacteria and longchain proteins prior to removal which can be detrimental to aquatic organisms if present in excess amounts.

With regard to degassing, as the strong upward flow of the water/air mixture through the high surface area substrate breaks the surface, the dissolved gases are stripped from the water and released into the air. This is a continuous process, yet can be adjusted by opening or closing the air valve to either increase or decrease degassing as needed.

With regard to self-cleaning, as the air moves up through the substrate an oscillating motion is produced that causes excess bacterial aggregates to slough off and fall to the bottom of the tank, thereby eliminating plugging of the substrate. These aggregates are removed along with settleable solid waste produced by the fish.

These results are effected in large part by the use of the flotation ring 22 at the upper extent of the substrate or media in association with the freely swingable lower extent of the substrate. When a flow of fluid occurs upwardly through the substrate, a rocking motion of the lower extent about the upper extent is effected. Such rocking motion or oscillation assists in sloughing off excess bacterial aggregates for self-cleaning. Such action also acts to enhance the other beneficial functions described herein.

An alternative embodiment, as best seen in FIG. 7, utilizes the mixing of air with the contaminated water and directing the flow of the air/contaminated water mixture downwardly through the serpentine channels in the substrate. induction pipe 68 is located either attached or in the reservoir 10 and has a lower end open and adapted to induce contaminated water therein. An air induction pipe 72 also has the induction inlet 74 immediately adjacent to the lower end of the pipe 68 for mixing contaminated water and air in a mixing chamber within the induction pipe to create an air lift. The air/contaminated pipe water mixture travels upward through the induction pipe 68 and is discharged through an opening 74. The flow of the air/contaminated water mixture is directed downwardly through the plurality of serpentine channels of the substrate 18 and is subsequently discharged at a lower portion of the substrate 10 The bacteria located on the surfaces of the substrate perform the oxygen/nitrogen exchange with the passage of the air/contaminated water mixture across the surface of the substrate.

The entire media 18 may be provided with a box 19 of rigid plastic sheeting on all four sides but open at the top and bottom to constrain the flow of fluid through the filter in the vertical direction. A small space may be provided between the top of the box and the float ring 102 to allow for the passage of water from the filter. See FIG. 15.

Another alternate embodiment of the invention is best seen in FIG. 8. A water pump 78 is located above the floor of the fish farthing reservoir. The water pump 78 is adapted to take contaminated water from the reservoir or adjacent source and to pump the contaminated water through a piping arrangement upwards to the top surface of the water in the reservoir. The piping arrangement has a remote end 82 terminating in a rectangular manifold 21 for discharging the pressurized contaminated water downwardly across the surface of the substrate 18 for the oxygen/nitrogen exchange between the bacteria on the surface of the substrate and the contaminated water. As in the prior embodiment, a box 19 may be provided.

A still further alternative embodiment, as seen in FIG. 9, has a water pump 86 whose intake 92 is from a reservoir or an adjacent source. Output is from beneath the media by manifold 21. In addition, pressurized fresh air or oxygen is brought in from a nonillustrated air blower or air compressor through air tubing 88 and connected to an air diffuser or other air source 90. The water pump has an open end 92 to receive unpressurized contaminated water and a manifold 21 at the discharge end, located immediately above the diffuser 90, to discharge the pressurized contaminated water upwardly through the serpentine passages and across the surface of the substrate 18. Discharge and 94 open end 21 formed as a manifold may also be positioned below the air diffuser. In addition, the air diffuser 90, because of its location with respect to the manifold 21, is adapted to discharge pressurized fresh air or oxygen concurrently through the serpentine passages and accomplish the oxygen/nitrogen exchange between the bacteria on the surface of the substrate and the contaminated water. Additional air may also be entrained into the water beyond the pump 86 through an air hole 87 in the line leading to the manifold. Air enters the flowing water through the Venturi effect.

As referred to hereinabove, the module 16 may be supported in the reservoir as by the float ring 22 illustrated in the primary embodiment. The module 16 may also be supported by a buoyant material such as styrofoam or the like. This is illustrated by a buoyant ring 102 surrounding the frame in the FIG. 7 embodiment which supports the media at a predetermined level with respect to the surface of the water.

In all embodiments, a clip may be secured to the module 16 at one end. The other end of the clip is adapted to be secured to the edge of the reservoir 10 which supports the substrate at a predetermined level with respect to the top of the reservoir or bends to accommodate changes in water level.

Lastly, all embodiments may utilize a support structure comprising legs extending downwardly from a frame of a module as in the prior embodiments and supports the substrate at a predetermined level with respect to the bottom of the reservoir. The legs may be separate elements or they may be coupled together at their upper extents to thereby constitute a unitive structure so constructed as not to interfere with the flow of fluid through the substrate 18.

Figure 10:
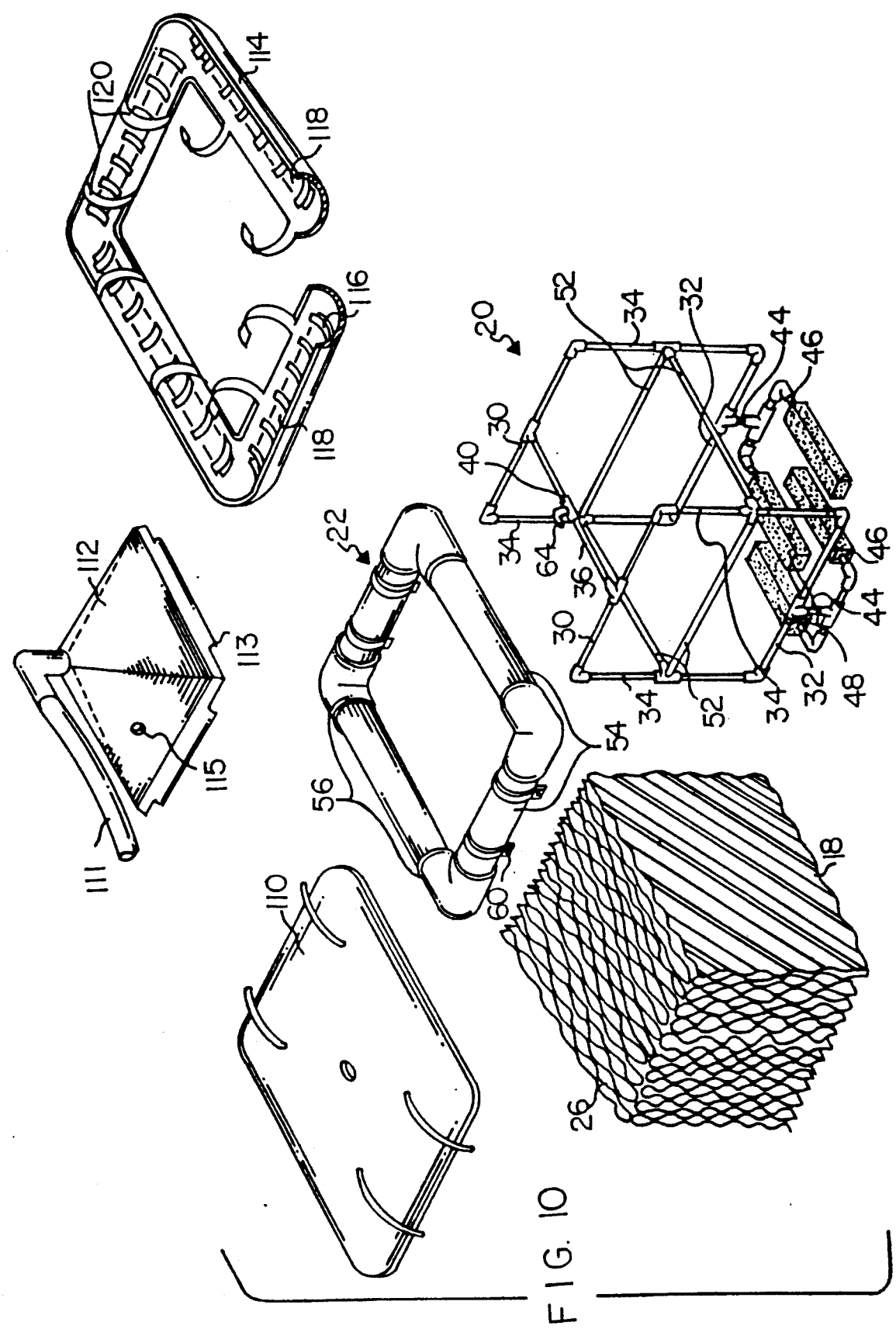
FIG. 10 is an exploded perspective showing of a filtration system constructed in accordance with an alternate embodiment of the invention.

The embodiment shown in FIG. 10 is similar to that disclosed in FIGS. 1-6. The major difference, however, is the inclusion of a sun shield 110. The sun shield is simply an opaque sheet which is preferably fabricated of a rigid or semi-rigid material so as to retain its shape during operation and use. Its size and shape are such as to overlie the flotation ring. Straps are provided near its corners for effecting the coupling between the sun shield and the flotation ring. The function of the flotation ring is to prevent light from producing unwanted algae growth inside the substrate when used in bright light, whether indoors or outdoors. A black sun shield is preferred but any dark color to achieve these objectives could be utilized. A sun shield similar to or analogous to the function described herein could readily be used in any of the other embodiments.

The FIG. 10 embodiment also includes two additional optional features, a hood and a mechanical filter. The hood 112 is a dome or pyramid-shaped structure having C-shaped fingers 113 or the like along each edge for securement to the ring 22, a line 111 is located at the upper apex of the hood and leads to a location remote from the apparatus and water for receiving foam. Such foam occurs through nature in certain fish reservoirs. When it does occur, it will move upwardly through the hood and line 111 to a remote location for being discarded as trash. Opening 115 allows the fluid entry pipe 64 to couple with the frame at fitting 40.

The second optional feature of the FIG. 10 embodiment is a mechanical filter. The mechanical filter is formed of a rigid elastomer to form a generally C-shaped, gutterlike support 114. The support 114 has C-shaped fingers or hooks 120 for coupling to the ring 22 around its periphery. Holes 116 are formed in the support so that when positioned between the media and ring, water from the media will pass through the holes. To effect the mechanical filtering of solids, a filter material 118 is located over the holes. A preferred filter material is commercially-available aquarium floss or open cell foam. Such floss or foam may be replaced or cleaned when saturated with contaminant solids.

The FIG. 11 embodiment features a filter or substrate fabricated of a construction other than the rectangular or cubic shapes of the prior embodiment. The substrate or media 124 of this embodiment has a circular shape when viewed from the top to thereby constitute a cylinder. The float ring 126 is of a torus configuration. It should be understood that other shapes are readily employable in this embodiment or any of the other embodiments. The functional results will accrue due to the use of the substrate in the manner of the other embodiments. In this particular embodiment, the dual air stone diffuser is replaced by a single manifold 130 in a circular configuration fed by line 128. Further a frame configured for supporting the media is preferably provided. Such frame allows for coupling with the buoyancy ring 126.

FIG. 12 illustrates a cone-shaped substrate or media 131. A frame 133 configured for supporting the media is again preferably provided. Such frame allows for straps to couple the frame to the float ring 135.

Other techniques could readily be utilized as a vehicle for creating the flow of fluids through the filter media. The FIG. 13 embodiment eliminates the air stone diffuser and, rather, employs a hollow air lift tube 140 extending vertically through an aperture extending through the center of the substrate 134. The media 134 is cubic as in the FIG. 10 embodiment with a ring 138. And as in the embodiments of FIGS. 7, 8 and 9, a box 136 surrounds the sides of the media. A feed line 142 for the flow of air is coupled into one wall of the air lift tube. The buoyancy of the air fed by the feed line will effect a flow of air upwardly through the air lift tube. This flow of air upwardly through the air lift tube effects a flow of air and water, not only through the air lift tube, but also through the rest of the substrate adjacent to the air lift tube. Such alternate source of effecting the flow of fluid could readily be applied to the other embodiments disclosed herein. In this embodiment, as in the other embodiments, a sun shield, foam fractionatging hood and/or mechanical filter may be provided on the upper surface of the flotation ring.

Figure 15:
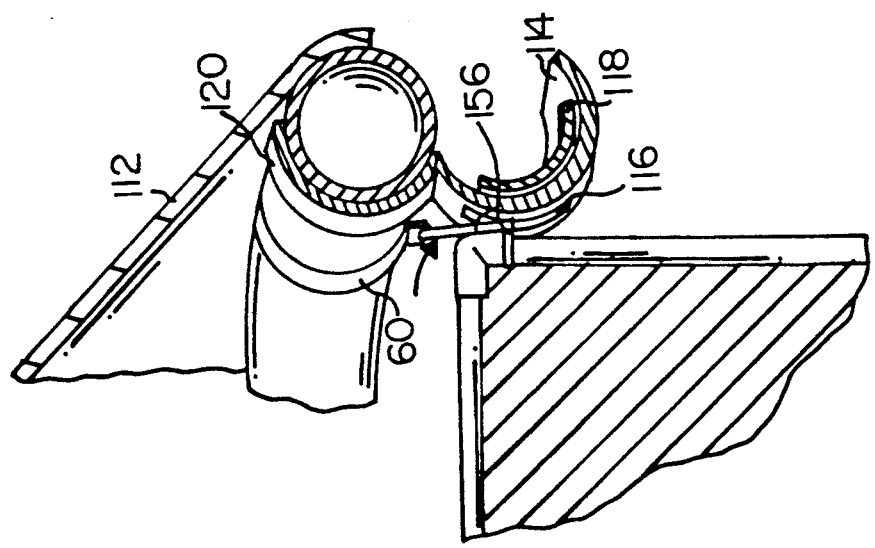
Figure 14:
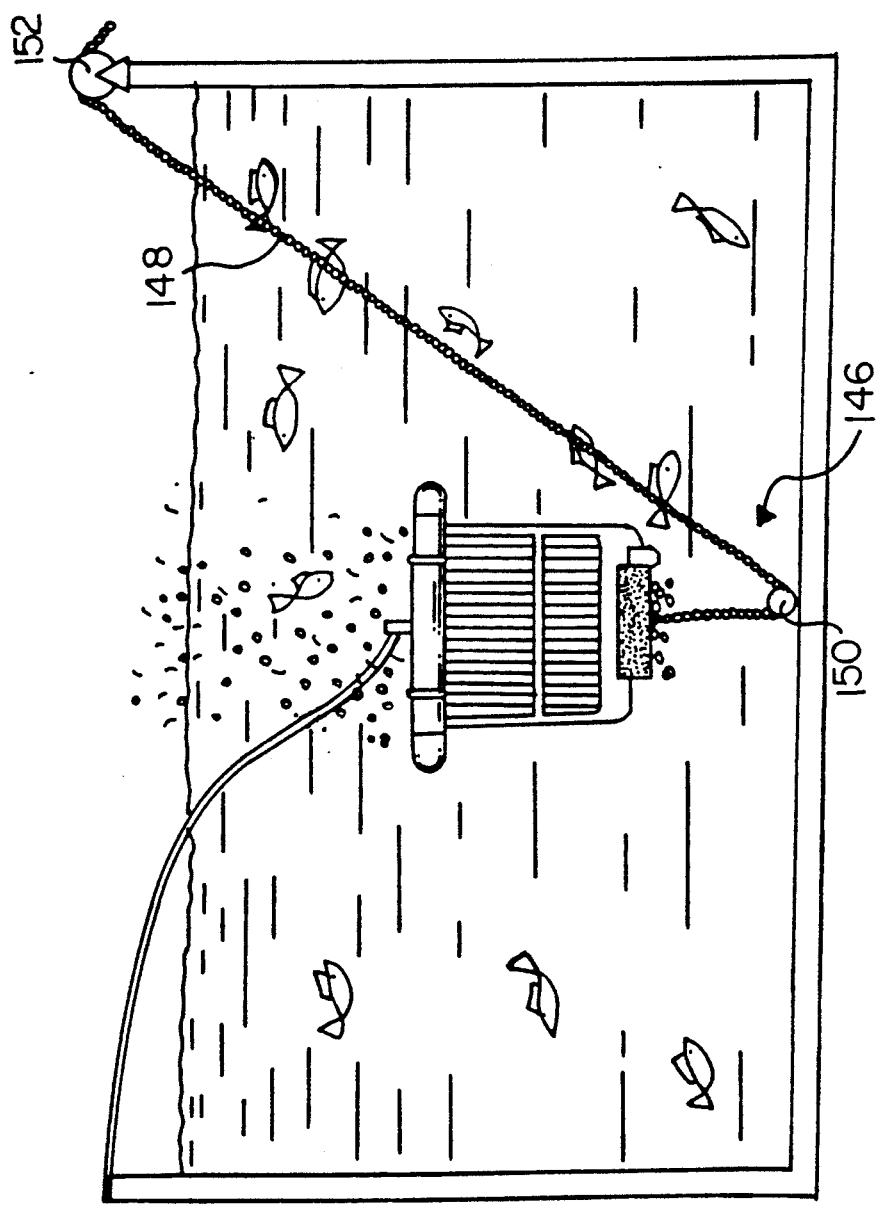
FIG. 14 is a sectional view through a portion of the FIG. 10 embodiment.

The last embodiment is disclosed in FIG. 14. This embodiment is similar to that disclosed in FIG. 2. In this embodiment, however, the flotation ring is formed of pipes having a reduced diameter to result in less buoyancy of the upper extent of the substrate. The lower end of the substrate is secured by a tether strap or straps shown in the preferred embodiment as a plastic line 148. The line has a pully 150 secured to the bottom of the body of water to hold the entire apparatus at an intermediate location in the water beneath the surface of the water. The line extends to an upper pulley 152 outside of the water. In this manner, the entire device has adjustment mechanisms 146 to vary its extent of submersion. In this manner, with the entire module, including the upper extent submerged, the flow of fluid from the source of pressure effects the same flow of water through the substrate as in all the prior embodiments with the same beneficial effects. It has been found in this embodiment, that a more aesthetic appearance accrues when used in highly visible outdoor areas such as ornamental ponds, with or without fish. In this embodiment, a rocking motion occurs to the lower extent of the substrate but it is a pivoting about a central extent of the substrate not about the upper extent as in the prior embodiments. This embodiment with the submerged substrate could be applied to all of the other embodiments discussed herein by their submersion beneath the surface of the water. FIG. 15 is a sectional view of a portion of the components of the FIG. 10 embodiment illustrating their coupling. Ring straps 60 are on the edges of the ring allowing the mechanical filter 114 with floss material 118 as well as the hood 112 to be coupled to the ring between straps 60. A frame tie 156 is provided at appropriate portions of the frame for coupling with the ring straps. Such coupling straps and ties are preferably used in all embodiments.

Any of the various supports for the various modules may be used interchangeably, depending on the particulars of the application, so long as the function is retained of properly positioning the module 16 spaced above the floor of the reservoir for allowing proper operation and use.

The device of the present invention floats in a pond, tank or lagoon and creates a compact, highly-efficient processing site that simultaneously provides complete aeration, optimal biological filtration, extensive circulation, degassing and foam fractionation, all in one air-powered unit. It is maintenance-free, requiring no cleaning, no chemicals, no water pump, no submerged wiring and no replacement parts. It requires minimal assembly and is warranted for years of continuous use.

The device is the most cost-effective and versatile water quality management device available. It accomplishes (a) aeration (energy-efficient oxygen transfer by a unique method that increases bubble surface area of contact and prolongs diffusion time); (b) bioconversion (self-sustaining, all-natural process that metabolizes organic wastes while successfully competing with algae for their nutrient sources, thereby preventing excessive algae growth); (c) circulation (continuous submerged circular pattern of aerated biofiltered, nitrified degassed, foam fractionated water that spreads throughout the pond without spray or turbulence); (d) degassing (stripping of harmful gases to maintain a healthy, aerobic, clean-smelling pond with minimum algae growth).

While the present invention has been described in a preferred and alternate embodiment, it is not intended to be so limited, but it is intended to be protected broadly within the spirit and scope of the appended claims. Now that the invention has been described,

What is claimed is:

1. A method for removing contaminants from a body of water comprising in combination the steps of:
   positioning a filter means in the water, the filter means having pluralities of separate tubular passages extending offset from the vertical therethrough with surfaces providing high surface area per volume;
   supporting biological agents on the surfaces for removing contaminants from water to be cleaned as it flows through the filter means;
   shielding the biological agents along the majority of the extent of the passages from deterioration by solar energy through the tubular shape of the passages and their orientation from the vertical;
   locating the filter means spaced from the bottom of the water to be cleaned;
   providing a fluid flow means with a discharge component;
   effecting the flow of a pressurized fluid by the fluid flow means, from the discharge component, through the water, and across the surfaces in circuitous paths for the removing of contaminants from the water; and
   positioning the discharge component beneath the filter means and above the bottom of the water for directing the flow of water upwardly through the filter means.

2. The method as set forth in claim 1 wherein the locating of the filter means is at the surface of the water.

3. The method as set forth in claim 1 wherein the locating of the filter means is beneath the surface of the water.

4. The method a set forth in claim 1 and further including the step of adjusting the height of the filter means to a predetermined height with respect to the surface of the water.

5. The method as set forth in claim 1 wherein the flow is effected essentially vertically.

6. The method as set forth in claim 1 and further including the step of mechanically filtering the pressurized fluid leaving the filter means.

7. The method as set forth in claim 1 wherein the pressurized fluid is a mixture of water and air with the air entering the flow of water by the Venturi effect.

8. The method as set forth in claim 1 and further including the step of conveying away the by-products of foam fractionation from above the filter means.

9. The method as set forth in claim 1 and further including the step of constraining the flow of pressurized fluid in generally vertically extending tubes.

10. The method as set forth in claim 1 and further including the adjusting of the height of the filter means with respect to the water level.

11. A method for removing contaminants from a body of water comprising in combination:

positioning a filter means in the water, the filter means having discrete tubular channels therethrough forming surfaces for the support of biological agents for assisting in the cleaning of the water in which it is positioned;

providing a frame assembly having generally horizontal tubular upper and lower frame members and generally vertical tubular intermediate frame members joining the upper and lower frame members thereby constituting a three-dimensional generally cubic shape, the tubular members adapted for receiving and supporting the filter means in the water, the tubular members being hollow and operatively interconnected for the passage of fluid therethrough and with a first opening operatively associated with an upper frame member for coupling with a source of pressurized fluid and with a second opening associated with lower frame member for coupling with diffuser means for effecting discharge of the pressurized fluid from the source of pressurized fluid upwardly through the water and across the surfaces of the filter means for cleaning of the water by the biological agents supported on the surface of the filter means;

effecting a flow of fluid through the frame assembly and filter means for effecting the removal of contaminants from the water;

constraining the flow of fluid through the filter means along paths defined by the tubular channels for increased contact between the fluid and the filter means; and securing a float ring with respect to the frame assembly and being horizontally disposed for providing the necessary buoyancy for maintaining the upper surface of the frame assembly adjacent to the surface of the water and with the lower surface of the frame assembly spaced from the bottom of the reservoir, the float ring being located to receive therein the fluid flowed through the filter media.

* * * * *